United States Patent [19]

Tanimura et al.

[11] 4,271,463

[45] Jun. 2, 1981

[54] HIGH VOLTAGE TRANSFORMER

[75] Inventors: Ken Tanimura, Tokyo; Toshio Onodera, Kamakura, both of Japan

[73] Assignee: Sony Corporation, Tokyo, Japan

[21] Appl. No.: 68,084

[22] Filed: Aug. 20, 1979

[30] Foreign Application Priority Data

Aug. 24, 1978 [JP] Japan .......................... 53-115842[U]

[51] Int. Cl.³ ....................... H02M 7/00; H01F 15/10

[52] U.S. Cl. .................................... 363/126; 336/185; 336/192

[58] Field of Search ............... 336/192, 198, 208, 185; 363/68, 126, 144

[56] References Cited

U.S. PATENT DOCUMENTS

| | | | |
|---|---|---|---|
| 3,609,616 | 9/1971 | Dumeige | 336/192 |
| 3,936,931 | 2/1976 | Hubbartt | 336/192 X |
| 3,939,450 | 2/1976 | Donnelly | 336/192 X |
| 4,091,349 | 5/1978 | Niederjohn et al. | 336/192 |

*Primary Examiner*—Thomas J. Kozma

*Attorney, Agent, or Firm*—Hill, Van Santen, Steadman, Chiara & Simpson

[57] ABSTRACT

A high voltage transformer for use in a television receiver or the like having a magnetic core, a primary winding, a secondary winding and a voltage rectifier. The secondary winding is wound on a coil bobbin and a holder is attached to the coil bobbin for holding a high voltage lead at its one end portion. The high voltage lead supplies a high DC voltage from the secondary winding to a cathode ray tube of the television receiver. The holder has an elongated cylindrical portion by which the high voltage lead is resiliently supported.

5 Claims, 7 Drawing Figures

HIGH VOLTAGE TRANSFORMER

BACKGROUND OF THE INVENTION

1. Field of the Invention

The present invention relates generally to a high voltage transformer, and is directed more particularly to a fly-back transformer for use with a television receiver.

2. Description of the Prior Art

In the art, a fly-back transformer, which applies a high voltage to the anode terminal of a cathode ray tube, deals with a very high voltage, so that a special attention must be paid thereto. Especially, there are many problems or difficulties involving the connection point between a lead wire for deriving a high voltage and fly-back transformer, and various structures have been proposed for the connection of the lead wire to the fly-back transformer.

One of the prior art proposals is a connector which connects one end of a lead wire to the output terminal of the fly-back transformer. This connector is, however, very expensive and hence results in an increase in cost.

In another example of the prior art, one end of a lead wire is not temporarily attached to the fly-back transformer proper but is connected directly to the winding of a high voltage coil or lead wire of a high voltage rectifying diode by soldering.

For example, the winding of a high voltage coil used in a fly-back transformer is a very thin enameled wire, while a high voltage cable, which connects the high voltage winding to the anode terminal of a cathode ray tube, is a thick covered wire. Therefore, it is hard to connect the high voltage wire with the lead wire and also there may occur such a defect that a disconnection is caused at the connection portion between the high voltage winding and cable during the connecting works because the cable is not fixed properly to a bobbin of the high voltage coil.

SUMMARY OF THE INVENTION

Accordingly, an object of the present invention is to provide a novel high voltage transformer.

Another object of the invention is to provide a high voltage transformer free from the defects inherent in the prior art.

A further object of the invention is to provide a high voltage transformer suitable for use as a fly-back transformer in a television receiver.

A yet further object of the invention is to provide a high voltage transformer with a bobbin by which the winding of the high voltage transformer is easily and positively connected to a lead wire without diconnection therebetween.

According to an aspect of the present invention there is provided a high voltage transformer for television receivers and the like which comprises a magnetic core, a primary winding, a secondary winding, a voltage rectifier, a coil bobbin for carrying the secondary winding thereon, a high voltage lead for supplying a high voltage DC output to a cathode ray tube, and a lead holder for holding one end of the high voltage lead, the holder being attached to the coil bobbin and having an elongated C-shaped pipe portion.

The other objects, features and advantages of the present invention will be apparent from the following description taken in conjunction with the accompanying drawings.

DESCRIPTION OF THE PREFERRED EMBODIMENTS

The present invention will be hereinafter described with reference to the attached drawings.

In general, the high voltage winding of a fly-back transformer is divided into a plurality of winding portions through a plurality of rectifying diodes.

Figure 1:
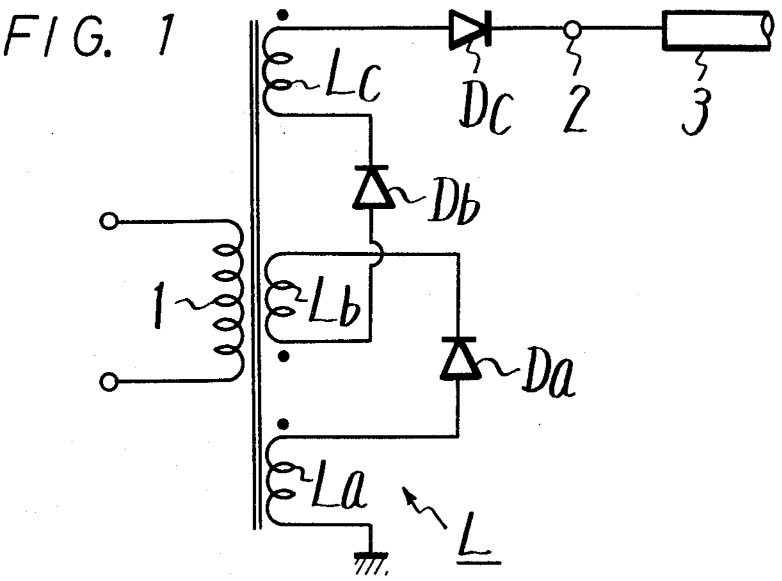
FIG. 1 is a connection diagram showing an example of the connection of the fly-back transformer according to the invention.

As shown in FIG. 1, the high voltage winding of an example of the fly-back or high voltage transformer according to the invention is divided into three winding portions La, Lb and Lc, which are wound on bobbins (described later), respectively and connected in series through rectifying diodes Da, Db and Dc between the ground and an output terminal. In this case, the sense or winding direction of the winding portion La is selected same as that of the winding portion Lc, but the sense of the intermedite winding portion Lb is selected opposite to that of the winding portions La and Lc. Since the diodes Da and Db can be connected to the winding portion in the space above the bobbin proper by changing the winding direction of the winding portions, the bobbin proper can be made quite compact.

In FIG. 1, reference numeral 1 designates an input winding (primary winding), L a high voltage winding (secondary winding) consisting of the winding portions La, Lb and Lc, 2 an output terminal, and 3 a lead wire, respectively.

Figure 2:
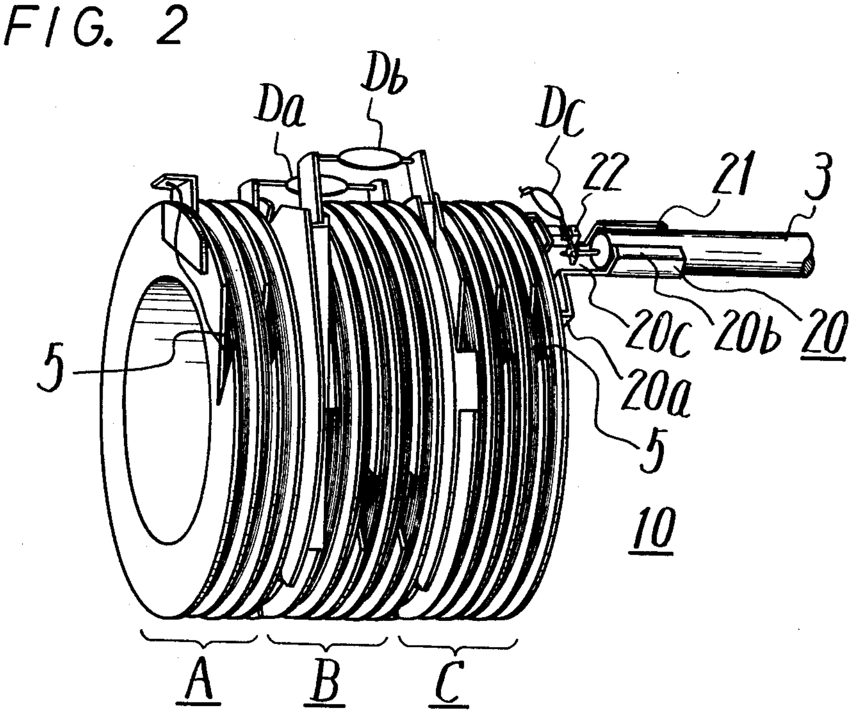
FIG. 2 is a perspective view showing an example of the fly-back transformer according to the present invention.

FIG. 2 is a perspective view showing an example of the high voltage transformer according to the present invention. In this example, a bobbin 10 is provided on which, for example, the high voltage windings L of the high voltage transformer are wound. In the example of FIG. 2, the bobbin 10 consists of three blocks A, B and C each of which is also divided into a plurality of sections. In the illustrated example, the block A is divided into three sections; the block B is divided into five sections; the block C is divided into five sections. Divided winding portions are wound on the respective sections of the blocks A, B and C, respectively. A recess or cut-off portion 5 is provided on each of the flanges which separate adjacent sections to bridge the windings between adjacent sections. in this case, the positions of the recesses 5 are selected differently between odd and even flanges with one another.

Figure 4:
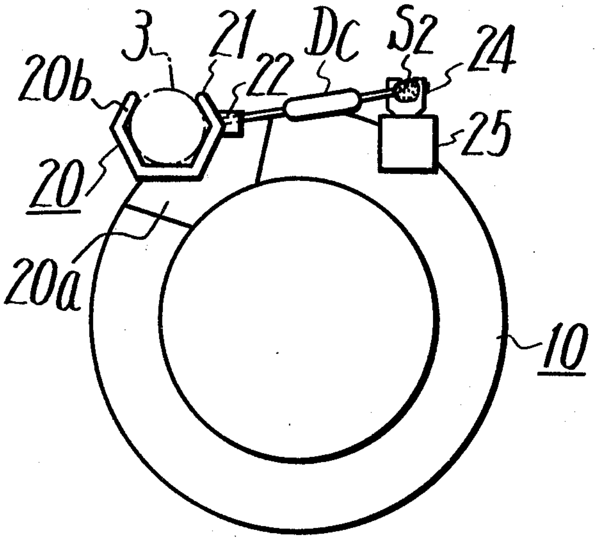
FIG. 4 is a front view of the fly-back transformer of the invention shown in FIG. 2.

According to the invention, the bobbin 10 is made of, for example, resin and a holder 20 for the lead wire 3 is provided on one side surface of the block C of the bobbin 10, which block C corresponds to the winding portion Lc. This holder 20 is also made of resin and consists of a base portion 20$a$, which is fixed to the free side surface of the block C, a cylindrical portion 20$b$ for resiliently supporting the lead wire 3, and a connecting portion 20*c*, which connects the cylindrical portion 20*b* with the base portion 20*a*. In this case, the holder 20 may be made integral with the bobbin 10. For example, as shown in FIG. 4, the cylindrical portion 20*b* of the holder 20 has a hexagonal cross-section, and one upper side of the hexagonal cylindrical portion 20*b*, by way of example, is cut away along its longitudinal axis to form a rectangular opening 21 extending in the longitudinal axis direction of the hexagonal cylindrical portion 20*b* of the holder 20. The connecting portion 20*c* of the holder 20 has such a configuration that it is extended from, for example, one or two lower sides of the hexagonal cylindrical portion 20. The lead wire 3 is inserted into the inside of the hexagonal cylindrical portion 20*b* of the holder 20 through the opening 21 to be supported therein by utilizing the resiliency of the hexagonal cylindrical portion 20*b*. The opening angle of opening 21 can be selected suitably and in the illustrated example is selected about 60°, and the length of hexagonal cylindrical portion 20*b* of holder 20 in its longitudinal axis direction can be selected suitably.

Figure 3:
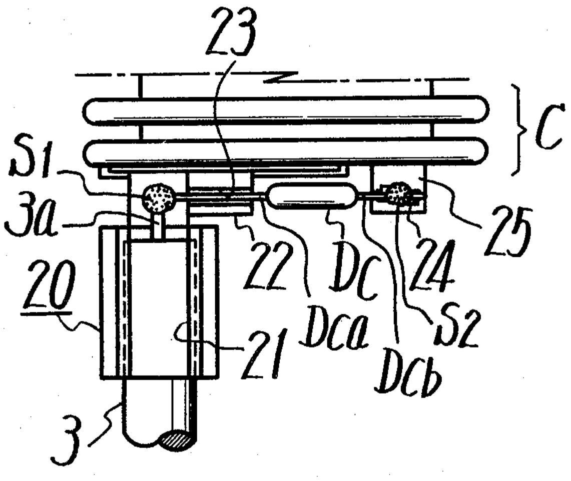
FIG. 3 is a plan view showing a part of FIG. 2.

The inner diameter of the hexagonal cylindrical portion 20*b* of holder 20 is selected to be a little smaller than the outer diameter of the lead wire 3 so as to resiliently hold the lead wire 3 in the hexagonal cylindrical portion 20*b* when the former is inserted into the latter (refer to FIGS. 3 and 4). The width of the opening 21 is of course smaller than the outer diameter of the lead wire 3 since the opening 21 corresponds to one side of the hexagonal cylindrical portion 20*b* of the holder 20. Thus, once the lead wire 3 is inserted into the inside of the hexagonal cylindrical portion 20*b*, the lead wire 3 hardly comes out from the hexagonal cylindrical portion 20*b*. When the lead wire 3 is inserted into the hexagonal cylindrical portion 20*b* of the holder 20, the lead wire 3 is positioned above and along the rectangular opening 21 of the portion 20*b* in parallel with each other and then pushed down through the opening 21 into the inside of the portion 20*b*. In this case, the opening 21 is widened by the lead wire 3 to such an extent that the width of the opening 21 becomes substantially the same as the outer diameter of the lead wire 3, then the lead wire 3 is further pushed inside the hexagonal cylindrical portion 20*b*, and the lead wire 3 is held resiliently by the cylindrical portion 20*b* therein along the center axis thereof.

As shown in FIGS. 2 and 3, a projection 22 made of resin is provided on one edge of the connecting portion 20*c* of the holder 20. This projection 22 has an engaging groove 23 formed thereon with which one of the lead wires of the diode DC engages to be held thereby. The projection 22 may be made integral with the holder 20. A connecting terminal piece 24, which is made of metal to have a fork-shaped configuration and serves to connect the other lead wire of the diode Dc with the wire of the winding portion Lc, is inserted into and fixed to the recess of an attaching member 25, which is provided on the bobbin 10 at the side where the base portion 20*a* of the holder 20 exists. This attaching member 25 can be made integral with the bobbin 10 similar to the holder 20.

The connection between the winding portion Lc and the diode Dc and the connection between the diode Dc and the lead wire 3 are carried out as follows. For example, after one end of the winding portion Lc is wound on the connecting terminal piece 24, and the lead wire 3 is inserted into the hexagonal cylindrical portion 20*b* of the holder 20, the diode Dc is located at such a predetermined position that a lead wire proper 3*a* of the lead wire 3 contacts with one lead wire Dca of the diode Dc and the other lead wire Dcb of the diode Dc contacts with the connecting terminal piece 24. Then, these contact portions are soldered, respectively, as shown in FIG. 3 at S1 and S2.

By the provision of the connecting terminal piece 24, holder 20 and so on, the connection between the winding portion Lc and the diode Dc and also the connection between the diode Dc and the lead wire 3 can be performed very easily to simplify the connecting work or process. In this case, since the lead wire 3 is held positively by the fixed holder 20 to the bobbin 10 and the winding portion Lc is connected to the connecting terminal piece 24 which is also fixed to the bobbin 10 through the attaching member 25, there occurs no fear that the lead wires are disconnected during the connection works.

Further, since the opening 21 is provided on the hexagonal cylindrical portion 20*b* of the holder 20 as set forth above, it is very easy to attach and detach the lead wire 3 but the holder 20 does not lose the function to hold the lead wire 3.

After the above assembly is finished, the primary winding 1 and a magnetic core (not shown) are assembled thereto to complete a fly-back transformer. Then, if the whole assembly is molded by a thermosetting resin or the like, the lead wire 3 and the high voltage bobbin 10 are completely bonded and shielded from the atmosphere. Thus, the anti-moisture and anti-voltage characteristics thereof are further improved.

Figure 5A:
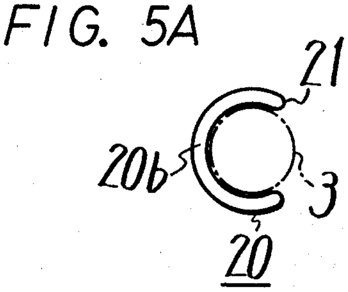
FIGS. 5A, 5B and 5C are respectively side views showing other examples of the holder used in the example of the invention shown in FIGS. 2, 3 and 4.
Figure 5B:
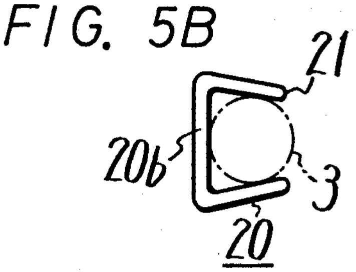
Figure 5C:
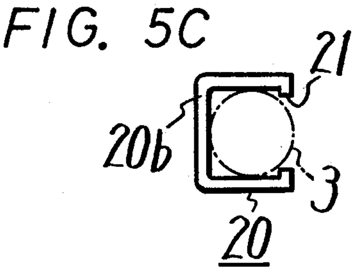

In the above example, the cross-sectional shape of the cylindrical portion 20*b* of the holder 20 is selected hexagonal but it is not necessary that the cross-sectional shape be limited to the hexagonal one. For example, as shown in FIGS. 5A, 5B and 5C, the cross-sectional shape of the cylindrical portion 20*b* can be selected of substantially C-shape, U-shape and rectangular shape in which each opening 21 is selected to have the width smaller than the outer diameter of the lead wire 3 for the latter to be attached to and detached from the cylindrical portion 20*b* easily. It is only important that the cross-sectional shape of the cylindrical portion 20*b* of the holder 20 be selected such that the lead wire 3 can be easily inserted into the cylindrical portion 20*b* of the holder 20 and held resiliently and also that the inserted lead wire 3 can be easily removed from the cylindrical portion 20*b*.

Further, it is possible that the holder 20 including the base portion 20*a*, the cylindrical portion 20*b* be formed separately from the bobbin 10 and the holder 20 be fixed to the bobbin 10 by a screw or the like or engaged with the bobbin 10.

The above description is given for a fly-back transformer as the example of this invention but the present invention can be applied to other high voltage transformers in which specific caution is required for connecting the high voltage winding to a lead wire with the same effect.

The diodes Da and Db are connected to the winding portions La, Lb and Lc in a well-known manner.

It will be apparent that many modifications and variations could be effected by those skilled in the art without departing from the spirits or scope of the novel concepts of the present invention. Therefore, the spirits or scope of the invention should be determined by the appended claims only.

We claim as our invention:

1. A high voltage transformer comprising a magnetic core, a primary winding, a bobbin, a secondary winding of fine wire wound on said bobbin, a relatively heavy lead wire extending out from said secondary winding, a projection of resilient insulating material attached to said bobbin and one end of said secondary winding connected thereto, a diode with two leads and one lead attached to said one end of said secondary winding on said projection, an insulating connector mounted on said bobbin and having one end connected to the other lead of said diode, said connector formed with a longitudinal gap extending lengthwise thereof and being of a size large enough to receive the end of said heavy wire snapped thereinto and said heavy lead wire and said other lead of said diode electrically connected together.

2. A high voltage transformer according to claim 1, in which said longitudinal gap has a hexagonal cross section.

3. A high voltage transformer according to claim 1, in which said longitudinal gap has a C-shaped cross section.

4. A high voltage transformer according to claim 1, in which said longitudinal gap has a U-shape cross section.

5. A high voltage transformer according to claim 1, in which the end of said heavy wire lies lengthwise in said longitudinal gap and is held firmly in place by resilient pressure of the walls of said connector.

* * * * *